AUTOMATIC FREQUENCY-CONTROL CIRCUITS

Filed March 15, 1951 2 Sheets-Sheet 1

INVENTOR
WENDELL R. BASTOW
BY Elmer J. Gorn
ATTORNEY

Jan. 10, 1956 W. R. BASTOW 2,730,616

AUTOMATIC FREQUENCY-CONTROL CIRCUITS

Filed March 15, 1951 2 Sheets-Sheet 2

INVENTOR
WENDELL R. BASTOW
BY Elmer J. Gorn
ATTORNEY

United States Patent Office 2,730,616

Patented Jan. 10, 1956

2,730,616

AUTOMATIC FREQUENCY-CONTROL CIRCUITS

Wendell R. Bastow, Natick, Mass., assignor to Raytheon Manufacturing Company, Newton, Mass., a corporation of Delaware Application March 15, 1951, Serial No. 215,775

3 Claims. (Cl. 250—20)

The present invention relates to automatic frequency-control circuits for radio receivers, and more particularly to an anti-drift automatic frequency-control circuit having a variable time constant.

The problem of maintaining the frequency of a radio receiver constant, or stable within desired limits, requires that the receiver shall simultaneously have a long time constant, in so far as fading signals are concerned, and a short time constant, in so far as signals which suddenly shift in frequency are concerned. Thus, if a receiver is employed under circumstances in which frequently the signal being received fades for short periods of time, the A. F. C. loop of the receiver should have a long time constant, so that the A. F. C. voltage will change but slowly. Then, when the fading signal returns, the receiver will still be tuned sufficiently close to optimum for the A. F. C. circuits to restore the proper tuning. If, on the other hand, circumstances are such that the signal which is being received may suddenly shift in frequency, as will happen, for example, in a Doppler radar system, it is necessary that the A. F. C. circuits shall respond quickly, and this requires a short time constant in the A. F. C. loop. The present invention addresses itself to the provision of automatic frequency-control circuit means which will provide both of these desirable features in a single organization.

In accordance with the present invention, the signal from the discriminator of a radio receiver system is monitored to provide automatic frequency control. This signal is provided to a reactance-type modulator, which in turn provides its output to the oscillator-I. F. portions of the system, through a network which has one of two time constants. The network itself employs biconductive rectifiers, more commonly known as "dry-disk" or "contact-type" rectifiers, which are characterized in that they have one resistance value when a voltage is impressed in one direction, and a different resistance value when a voltage is impressed in the other direction. Such rectifiers are made, for example, of germanium, selenium, or copper oxide, and are of two elements, hence called diodes. A selenium diode can be so operated, for example, that the resistance to current flow in one direction is 500,000 ohms, while the resistance to current flow in the opposite direction is 100 megohms, these values being determined by the voltages applied across the diode. The network includes further means to bias the biconductive rectifiers, or diodes, so that, in the absence of a discriminator output signal exceeding a prescribed magnitude, the time constant is long, while, in the presence of a discriminator output signal exceeding such prescribed magnitude, the time constant is short. This network is included in the A. F. C. loop between the discriminator and the reactance modulator, and governs the speed with which a control voltage at the reactance modulator can be changed, the speed being slow during mere fading, and hence low-amplitude discriminator output signals, and fast during sudden frequency shifts which result in large amplitude output signals from the discriminator.

Further advantages and features of the present invention will become more apparent from the detailed description of certain embodiments thereof which follows. This description refers to the accompanying drawings, wherein.

Figure 1:
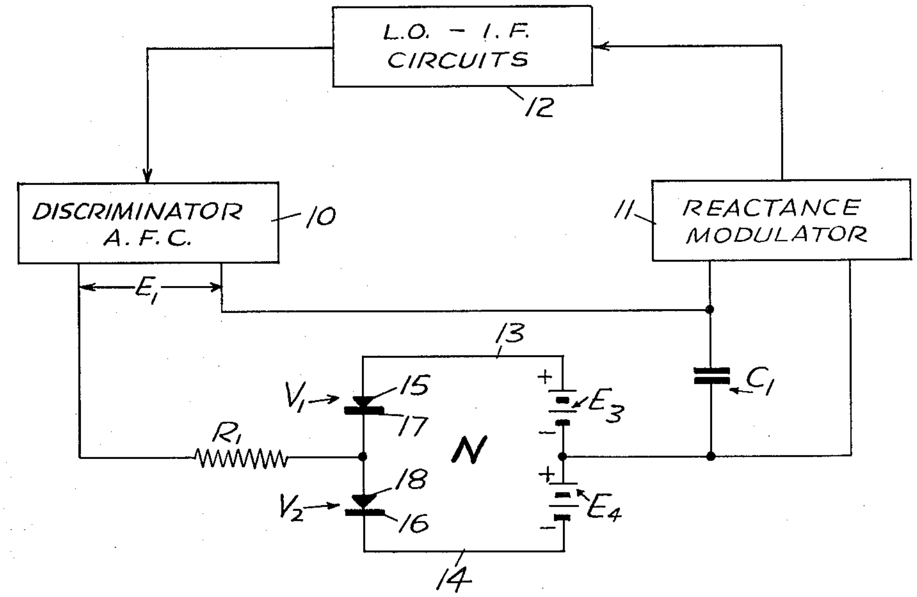
Fig. 1 illustrates a system in accordance with the invention.
Figure 2:
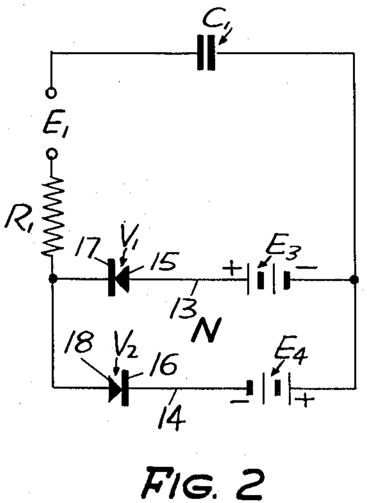
Fig. 2 is a simplified circuit in accordance with Fig. 1.

Referring now to Figs. 1 and 2, the discriminator 10 of this system provides an output voltage $E_1$ which is normally zero, or has a value in one sense or the other lying within prescribed limits. This voltage is applied across a capacitor $C_1$ through a resistor $R_1$ and a time constant network N in series. The capacitor $C_1$ is in the input to a reactance modulator 11, which in turn controls the local-oscillator-I. F. circuit 12 of the system. The network N is made of two parallel branches 13 and 14. The first branch 13 has in series a contact-type diode $V_1$ and a unidirectional voltage source $E_3$, while the second branch 14 has in series a second contact-type diode $V_2$ and a second voltage source $E_4$. In the first parallel branch 13, the positive side of the voltage source $E_3$ is connected to the cathode 15 of the diode $V_1$, while in the second parallel branch 14, the negative side of the voltage source $E_4$ is connected directly to the anode 16 of the diode $V_2$. The negative side of $E_3$ is connected to the positive side of $E_4$, while the anode 17 of $V_1$ is connected to the cathode 18 of $V_2$. Thus, considering the A. F. C. loop $R_1$, N, and $C_1$, the discriminator outputs $E_3$ and $E_4$ are oppositely poled in this loop, as are $V_1$ and $V_2$. This is more easily apparent from Fig. 2.

The voltage $E_1$ from the discriminator 10 is the A. F. C. error voltage of the system, and this is fed to the input of the reactance modulator 11 through what amounts to a filter made up of the resistor $R_1$ in series with either of the diodes $V_1$ or $V_2$, and the capacitor $C_1$, the diodes $V_1$ and $V_2$ being each biased in its so-called "nonconducting" direction between voltage sources $E_3$ and $E_4$, respectively. If the voltage $E_1$ is zero, or less than $E_3$ or $E_4$, the time constant of this filter section will be approximately $$T_1=(R_1+\tfrac{1}{2}R_2)C_1 \qquad \text{Relation (1)}$$

where $R_2$ is the leakage resistance of either of the diodes $V_1$ or $V_2$ in the "nonconducting" condition, the diodes here being of like resistance characteristics. The term "nonconducting" condition is here meant to be that condition in which the diode $V_1$ or $V_2$ has the higher resistance ($R_2$), as contrasted with the so-called "conducting" condition in which the diodes have much smaller resistance.

If, on the other hand, the error voltage $E_1$ is greater than $E_3$ or $E_4$, then either one of the diodes $V_1$ or $V_2$ will become "conductive," depending upon the polarity of the error voltage. The time constant of the filter section is then approximately $$T_2=R_1C_1 \qquad \text{Relation (2)}$$

Relation (2) is based upon the assumption that the resistance of each voltage source $E_3$ and $E_4$, and of each diode $V_1$ and $V_2$, in the forward, or "conducting," direction, is much less than the resistance of the resistor $R_1$.

It will be seen that the voltage sources $E_3$ and $E_4$ can be so chosen that, for normal variations of the discriminator output voltage $E_1$ in a particular receiver system, the time constant of the above-described A. F. C. circuit can be made quite long. This will provide that, if the signal which furnishes the output voltage $E_1$ is lost, the charge on the capacitor $C_1$ which controls the reactance modulator 11 will drift but slowly to another value, so that, if the signal returns within a reasonable time, the receiver system will still be tuned, or nearly in tune, and able to be returned to accurate tune. However, if there is a sudden shift in signal frequency, as happens, for example, in the case of Doppler radar systems, the discriminator output voltage $E_1$ will shift radically in both magnitude and direction, thereby rendering one or the other of diodes $V_1$ or $V_2$ conductive, in spite of the bias furnished by either voltage source $E_3$ or $E_4$. The time constant of the A. F. C. loop is then radically less than in the former condition, and the reactance modulator 11 is caused to shift the tuning of the local oscillator, and hence of the entire receiver system, fast enough to follow the signal.

Figure 4:
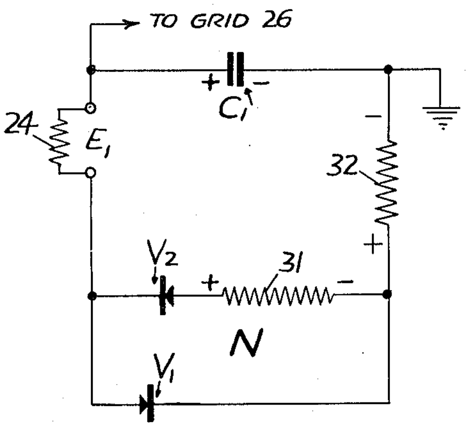
Fig. 4 is a simplified circuit in accordance with Fig. 3.
Figure 3:
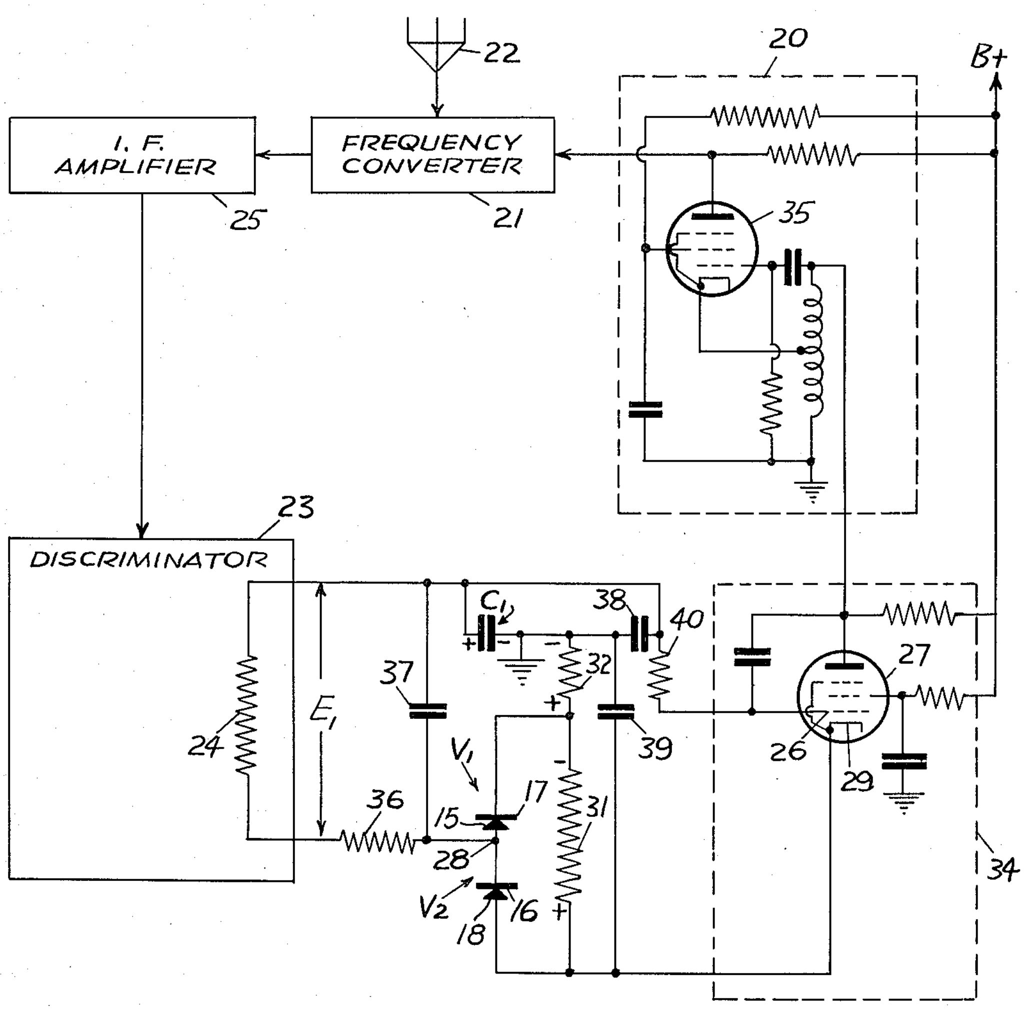
Fig. 3 illustrates another embodiment of the invention.

It will be further seen from Fig. 2 that the system illustrated in Fig. 1 is one in which, in the quiescent state, there is no charge upon the capacitor $C_1$ if the sources $E_3$ and $E_4$ are equal in magnitude, for these sources feed the capacitor $C_1$ in opposition. In this system, the only charge that exists upon the capacitor $C_1$ is that which is furnished by the discriminator output $E_1$. Figs. 3 and 4 illustrate a system wherein the capacitor which serves this function is provided with an initial charge.

In Fig. 3, a local oscillator circuit 20 provides a local oscillator signal to a frequency converter 21, to which an antenna 22 is also connected. The output of the frequency converter, which, as is well known, is an intermediate frequency signal, is provided to an I. F. amplifier 25 and therethrough to a discriminator 23. The discriminator 23 has an output resistor 24 across which the output voltage $E_1$ is developed. One end of this resistor is connected to the control grid 26 of a reactance tube 27, while the other end is connected to the junction 28 of the diodes $V_1$ and $V_2$. The cathode 29 of the reactance tube 27 is grounded through resistors 31 and 32 in series, and the voltage drop across the first of these resistors 31 is applied across both of the diodes $V_1$ and $V_2$ in series. This voltage drop is equivalent as far as the diodes $V_1$ and $V_2$ are concerned to the combined voltages $E_3$ and $E_4$ in Fig. 1, and is applied with the same polarity. As will be seen more easily from Fig 4, the diodes $V_1$ and $V_2$ are thereby both biased in the "nonconductive" condition, and in this case, too, they are in parallel branches in the A. F. C. loop, of which only one branch, however, contains a biasing voltage source. This is not of great significance, however, for, as has been previously pointed out, the resistance of the biasing voltage source can be made negligible in calculating the short time constant $T_2$.

The voltage drop across the cathode resistors 31 and 32 of the reactance tube 27 tends to charge the capacitor $C_1$ in a direction which would place a positive charge upon the side thereof which is connected to the control grid 26. That portion of the charging voltage due to the first of these resistors 31 is applied through diode $V_2$ in the "nonconductive" condition, while the portion of the charging voltage due to the remaining resistor 32 is applied through diode $V_1$ in the opposite direction against the bias due to the drop across the first resistor 31. In practice, resistor 32 may be, and preferably is, greater than resistor 31, so that the capacitor $C_1$ will always have a charge upon it which maintains the control grid 26 positive with respect to the cathode 29 of the reactance tube 27, and this tube is continuously conductive.

The reactance tube itself is in a circuit 34 of a well-known kind, and serves to modulate the local oscillator circuit 20 in a fashion which is also well known. The local oscillator circuit 20 itself includes a tube 35 in a Hartley-type circuit, and it will be appreciated that this is merely an illustration of one of the many oscillator circuits which may be used. The resistor 36 and capacitor 37, appearing in the A. F. C. loop in Fig. 3, are the usual antihunt network commonly found in circuits of the feed-back type. The capacitors 38 and 39 are by-pass capacitors, while the resistor 40 is a grid current-limiting resistor.

It will be appreciated from Fig. 4 that the same generic operation is afforded by the circuit of Fig 3 as is afforded by that of Fig. 1. The voltage which appears across the diode biasing resistor 31 is divided between the diodes $V_2$ and $V_1$, so that each is biased to substantially the same extent, so far as a signal $E_1$ is concerned. The remaining resistor 32 is in series with the two parallel branches containing the diodes $V_2$ and $V_1$, and furnishes the main portion of the fixed bias which exists across the capacitor $C_1$. This resistor is also equivalent to resistor $R_1$ in Fig. 2.

The diodes $V_1$ and $V_2$ may have practically any desired resistance values in the forward and reverse directions, that is, in the so-called "conducting" and "nonconducting" states. The resistance that is had in either direction will be determined in practice by the operating voltage that is applied to the particular diode which is employed. Front-to-back ratios ranging from 4 to 1 to 200 to 1 may be obtained, as those skilled in the art are well aware. In Figs. 3 and 4, the resistors 31 and 32 may have values of approximately 6,000 and 12,000 ohms, respectively, in a typical reactance-tube circuit, and the resistances of the diodes $V_1$ and $V_2$ may be adjusted accordingly.

Many other variations and modifications of the invention will occur to those skilled in the art, and it is therefore intended that the claims which follow shall not be limited by the particular details of the embodiments that have been herein described, but only by the prior art.

What is claimed is:

1. A frequency control system for a beat-frequency type radio receiver comprising a discriminator centered at a reference frequency and having an output resistor whose terminals provide a unidirectional output voltage the magnitude and sense of which depend, respectively, upon the amount and direction of deviation of an input signal from said reference frequency, a controllable local oscillator and mixer and intermediate frequency circuits in said receiver, a connection from said intermediate frequency circuit to said discriminator to provide said input signal, a reactance modulator having its control grid circuit connected directly to one of said discriminator output resistor terminals, said control grid circuit also having an input condenser forming a directly shunted part thereof, said reactance modulator being also connected to said oscillator to control the frequency thereof, a variable time constant circuit connected between the output of said discriminator and said modulator and including said condenser, said circuit having first and second parallel branches each branch including a rectifier of the type which has a first relatively low resistance value in the conductive condition and a second relatively high resistance value in the non-conductive condition, said rectifiers being poled in opposite directions in said circuit, and means forming part of the cathode circuit of said reactance modulator for providing bias voltage for said rectifiers in the non-conductive condition in the absence of said output voltage, said bias voltage having a value which is intermediate the voltage values of said output voltage for no input signal to said discriminator and for an input signal having maximum frequency deviation from said reference frequency, whereby said variable time constant circuit has the faster time constant for received signals which shift violently in frequency and the slower time constant when received signals are absent or shift but slowly in frequency.

2. A system according to claim 1 wherein the resistance modulator comprises an electron tube having at least an anode, a cathode and a control grid, a cathode self-biasing resistor, and a source of anode-cathode voltage connected across the anode-cathode path and said resistor in series, and the rectifiers are connected in series across a portion of said resistor, said condenser is connected at one side to said control grid and at the other side to the end of said resistor not connected to said cathode, said output voltage is connected between the junction of said rectifiers and said control grid, said rectifiers are both poled to be furnished said bias voltage by the drop across said resistor due to current flow in said tube, and said tube is in a conductive state.

3. A system according to claim 2 wherein the portion of said resistor across which said rectifiers are connected has a resistance value less than half the total resistance of said cathode self-biasing resistor.

References Cited in the file of this patent

UNITED STATES PATENTS

| | | |
|---|---|---|
| 2,433,350 | Earp | Dec. 30, 1947 |
| 2,473,790 | Crosby | June 21, 1949 |
| 2,489,262 | Buckbee | Nov. 25, 1949 |
| 2,495,326 | Hansell | Jan 24, 1950 |
| 2,505,642 | Hugenholtz et al. | Apr. 25, 1950 |